United States Patent [19]
Ikeda et al.

[11] Patent Number: 4,748,504
[45] Date of Patent: May 31, 1988

[54] VIDEO MEMORY CONTROL APPARATUS

[75] Inventors: Tetsuya Ikeda; Yukitoshi Tsuboi; Shigeru Hirahata, all of Yokohama, Japan

[73] Assignee: Hitachi, Ltd., Tokyo, Japan

[21] Appl. No.: 4,556

[22] Filed: Jan. 20, 1987

[30] Foreign Application Priority Data

Jan. 29, 1986 [JP] Japan .................................. 61-7917

[51] Int. Cl.$^4$ .......................... H04N 7/08; H04N 5/262
[52] U.S. Cl. ...................................... 358/142; 358/22; 358/160; 358/183; 340/721; 340/749
[58] Field of Search ................. 358/22, 142, 148, 160, 358/183; 340/721, 723, 749, 814

[56] References Cited

U.S. PATENT DOCUMENTS 4,218,710 8/1980 Kashigi et al. ...................... 358/183
4,626,837 12/1986 Priestly .............................. 340/723

FOREIGN PATENT DOCUMENTS 57-41154 9/1982 Japan .

*Primary Examiner*—James J. Groody
*Assistant Examiner*—Michael D. Parker
*Attorney, Agent, or Firm*—Antonelli, Terry & Wands

[57] ABSTRACT

The video memory control apparatus of the present invention has the first and second counters for repetitiously counting the clock signal at an interval of the display cycle period. The second counter is reset by an external synchronization signal. The first counter is reset by the counter reset signal supplied from the counter reset signal generator circuit. The counter reset signal is used to continue resetting the first counter from when the first counter terminates counting the display cycle period to when the second counter terminates counting the display cycle period. When an external synchronization with a phase shift is inputted, the first counter is kept reset by the counter reset signal for a period corresponding to the phase shift of the external synchronization signal. Consequently, in a case of the superimpose display, even if the external synchronization signal undergoes a phase shift, the synchronization can be established again in a short period of time.

4 Claims, 4 Drawing Sheets

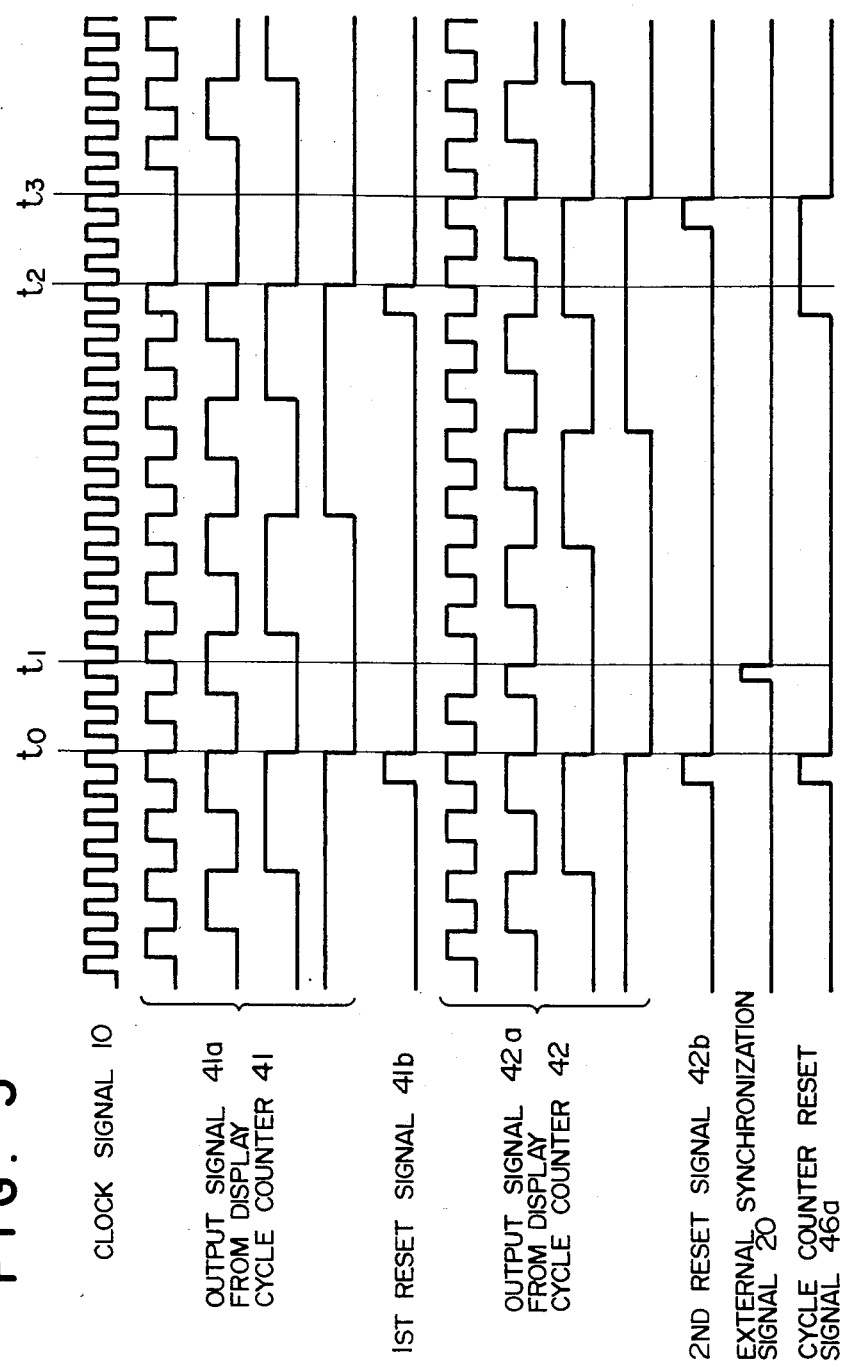

VIDEO MEMORY CONTROL APPARATUS

BACKGROUND OF THE INVENTION

The present invention relates to a video memory control apparatus for use with a display in which characters, graphics, and the like are displayed on a picture screen, and in particular, to a video memory control apparatus in which signals of characters or graphics generated by a personal computer or the like and television signals are changed over and then are outputted to a display, thereby effecting a so-called superimpose function to superimpose characters or graphics on a television picture reproduced on a picture screen of a display.

To display a superimposed picture of a character or graphics on an image of television signals, an appropriate synchronization is required to be established between the television signals and the character or graphics signals.

However, if a phase shift occurs in the synchronization signal of the television signals and that of the character or graphics signals, the synchronization of the picture displayed on the display is disturbed and hence the image of the picture screen is distorted or the data stored in the video memory is destroyed in some cases.

Such a conventional video memory control circuit is described in the Japanese Patent Examined Publication No. 57-41154. According to this video memory control circuit, in order to prevent the adverse effect due to the phase shift of the synchronization signals, when a phase shift takes place in the horizontal synchronization signal of the television video signal, the clock count operation is kept achieved for a predetermined count during the horizontal period in which the phase shift occurs and thereafter the count operation is stopped; and then the clock count operation is restarted with the next horizontal synchronization signal.

However, in the conventional video memory control circuit described above, the period for which the clock count operation is stopped after the predetermined count of the count operation due to the phase shift of the horizontal synchronization signal becomes to be up to a maximum of a horizontal period. This clock count stop period causes a disadvantage that accesses for effecting the write and read operations of display data on the video memory is prevented. The operation to write display data in the video memory is ordinarily controlled by a microprocessor (to be abbreviated as MPU); however, during the clock count stop period, the MPU is prevented from accessing the video memory and hence the processing efficiency of the MPU is lowered.

Particularly, in a system in which a memory divided into a plurality of storage areas and each storage area is allocated to the display, the system work memory, the buffer memory, or the like, when the clock count operation is stopped, the read and write operations are inhibited not only on the display area but also on the other areas, which deteriorates the processing speed of the system as a whole.

There has been a video memory control apparatus effecting a so-called cycle steal display read in which the operation clock of the MPU is commonly used for the count output signal of the display circuit and an unused period of the display read cycle is utilized by the MPU to access the video memory. In an apparatus achieving the cycle steal display read, the MPU clock is stopped for the clock count stop period of the display circuit, which leads to the disadvantages that the processing of the MPU is stopped for a maximum of a horizontal period and that a runaway of the MPU occurs due to a sudden stop of the MPU clock.

SUMMARY OF THE INVENTION

It is therefore an object of the present invention to provide a video memory control apparatus in a display circuit achieving character/graphics display in synchronism with a synchronization signal from an external device wherein even a phase shift occurs in the external synchronization signal, the synchronization is again established in a short period of time so as to prevent the deterioration of the MPU processing efficiency and the interruption of the MPU processing, thereby preventing the data destruction in the video memory and removing the disadvantages of the prior art technique.

The video memory control apparatus of the present invention comprises a first counter for counting a clock signal and for generating a first reset signal when a predetermined count value is reached, a second counter to be reset by an external synchronization signal for counting the clock signal and for generating a second reset signal when a predetermined count value (beforehand set to a value identical to the count value of the first counter), and a counter reset signal generate circuit for initiating a reset operation of the first counter in response to the first clock signal and for releasing the reset operation of the first counter in response to the second reset signal.

The video memory is controlled by use of the output signal from the first counter. Ordinarily, the first counter and the second counter output the reset signals at the same timing.

Even if the synchronization signal is subjected to a disturbance, since the first counter is predetermined and continues counting up to the predetermined count value, the address to be supplied to the video memory is not suddenly changed and hence a sudden disturbance of a picture is not caused.

When the external synchronization signal is disturbed, the timing of the second counter to generate the reset signal is delayed with respect to the reset signal generated by the first counter by a period equal to the phase shift of the synchronization signal. The first counter retains the reset state for a period corresponding to the phase shift, and when the second reset signal is outputted, the first counter restarts the count operation; thereafter, the first counter continues the count operation in synchronism with the external synchronization signal.

Consequently, the period for which the access to the video memory is inhibited can be limited to the period of the phase shift of the synchronization signal.

BRIEF DESCRIPTION OF THE DRAWINGS

The present invention will be apparent from the following detailed description taken in conjunction with the accompanying drawings, in which:

FIG. 5 is a timing chart showing the signal waveforms at respective sections of the video memory control apparatus according to the present invention.

DESCRIPTION OF THE PREFERRED EMBODIMENTS

Figure 2:
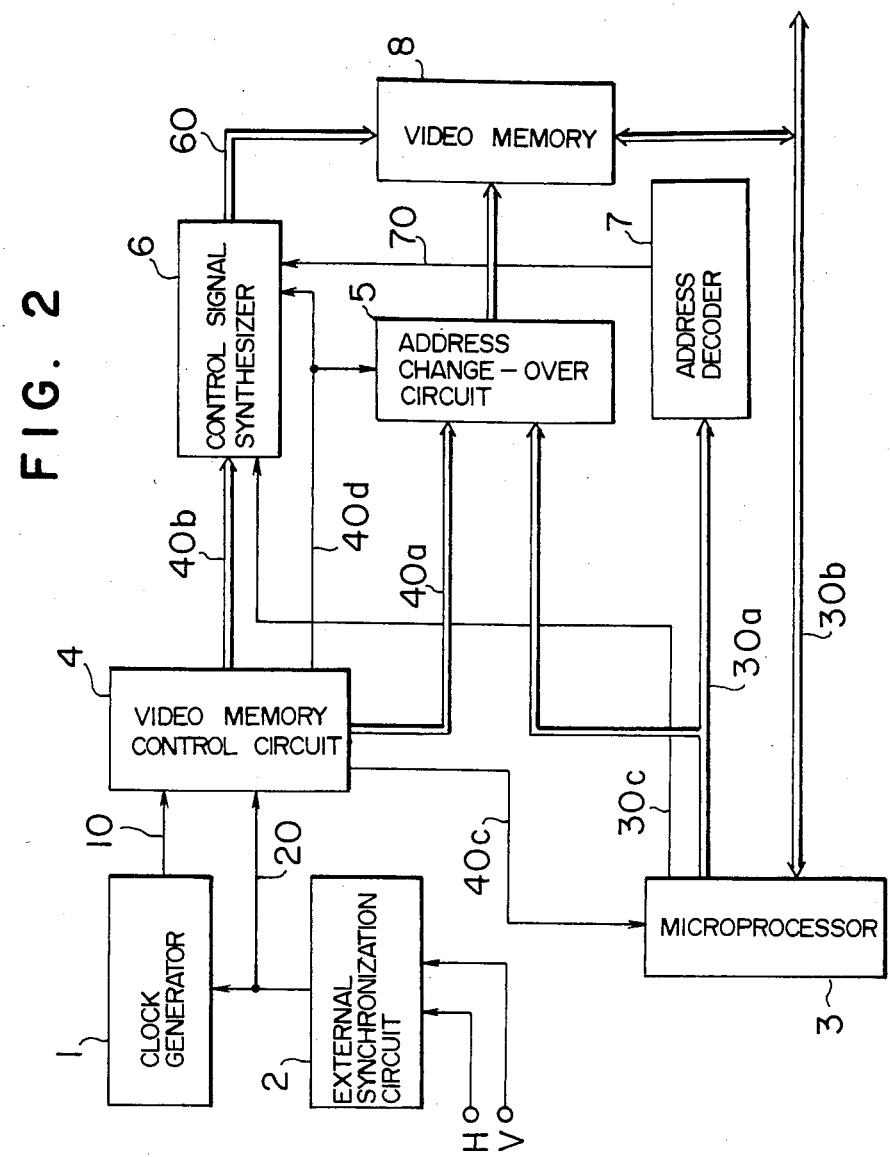
FIG. 2 is a circuit block diagram of a display unit to which the video memory control apparatus of the present invention is applied.

FIG. 2 shows a display unit to which the video memory control apparatus of the present invention is applied. The display unit comprises a clock generator circuit 1, an external synchronization circuit 2, a microprocessor 3, a video memory control circuit 4, an address change-over circuit 5, a video memory control signal synthesize circuit 6, an address decoder circuit 7, and a video memory 8.

The clock generator circuit 1 generates a clock signal 10 and supplies the signal 10 to the video memory control circuit 4. The external synchronization circuit 2 generates a frame synchronization signal 20 from the horizontal and vertical synchronization signals inputted from an external device and supplies the frame synchronization signal 20 to the clock generator circuit 1 and the display signal generator circuit 4.

The video memory control circuit 4 comprises a circuit configuration of FIG. 1 which will be described later and outputs a display address signal 40a, a video memory control signal 40b, an MPU clock signal 40c, and an MPU/display address change-over signal 40d.

The address change-over circuit 5 effects a change-over operation between the display address signal 40a and the MPU address signal 30a based on the display address change-over signal 40d and supplies the obtained signal to the video memory 8. The control signal synthesize circuit 6 achieves a change-over operation between the video memory control signal 40b from the display signal generator circuit 4 and the MPU control signal 30c from the MPU 3 according to the state of the address change-over signal 40d and the state of a video memory select signal 70 which is an output signal from the address decoder 7 and outputs the resultant signal to a control signal input terminal of the video memory 8. The video memory 8 is used to store a picture data of a display screen including 256 dots in the horizontal direction and 204 lines in the vertical direction as shown in (a) of FIG. 3.

During a period in which the address bus 30a is connected to an address input terminal of the video memory 8 by the address change-over circuit 5, a picture data supplied via a data bus 30b is written at an address supplied via an address bus 30a from the MPU 3.

During a period in which the display address signal 40a is supplied to the video memory 8 via the address change-over circuit 5, a display data is read into the data bus 30b from an address of the display memory 8 corresponding to the display address signal 40a and is supplied to a display unit (not shown) connected to the data bus 30b.

Figure 3:
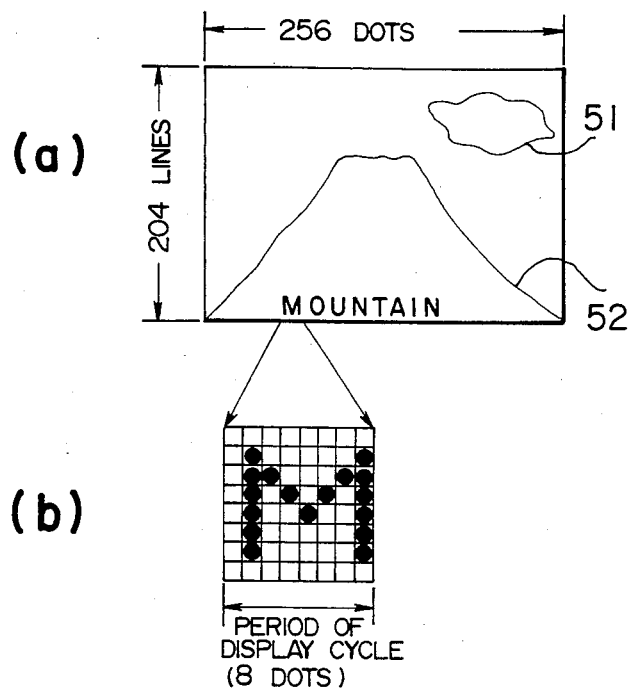
FIG. 3 is pattern diagrams showing an example of a display pattern of the display unit.

An example will be described in which characters "MOUNTAIN" are superimposed on the television picture including "a mountain 52" and "a cloud 51" as shown in FIG. 3.

In this embodiment, a character is constituted from the pixels of 8×8 bits. In (b) of FIG. 3, a character pattern of "M" is illustrated. Here, a display cycle period is defined to include eight bits in the horizontal direction. A display cycle period may be defined to include, for example, 16 bits depending on the configuration of the character font.

Figure 1:
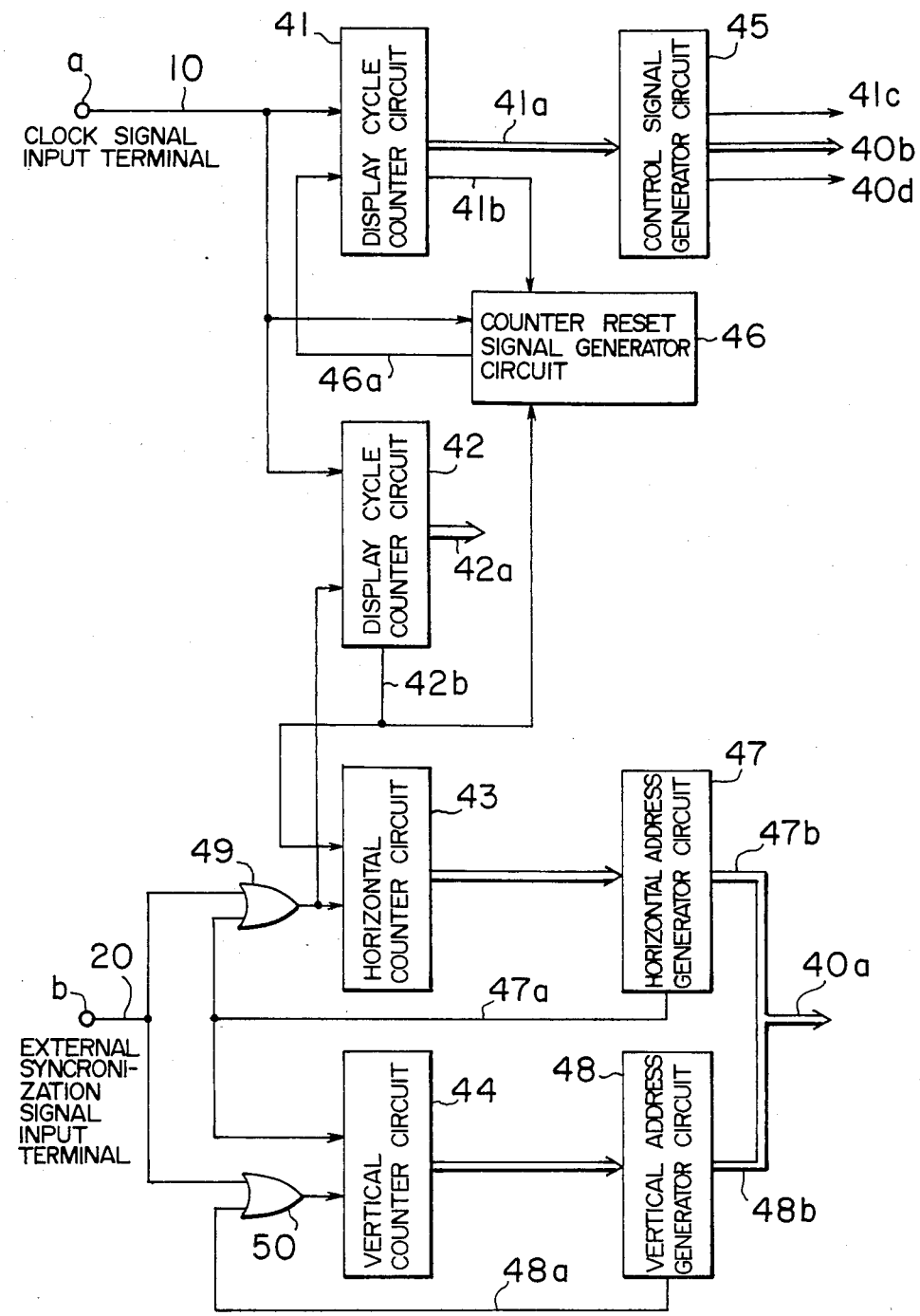
FIG. 1 is a schematic diagram showing the primary circuits of the video memory control apparatus according to the present invention.

FIG. 1 shows a concrete circuit diagram of the video memory control circuit 4, which comprises a display cycle count circuit 42, a horizontal count circuit 43, a vertical count circuit 44, a display memory control signal generator circuit 45, a counter reset signal generator circuit 46, a horizontal address generator circuit 47, a vertical address generator circuit 48, OR circuits 49–50, a clock signal input terminal a, and an external synchronization signal input terminal b.

Referring to the timing chart of FIG. 5, the operation of the video memory control circuit 4 will be described. From the clock generator circuit of FIG. 2, a clock signal 10 is supplied via the clock signal input terminal a to the display cycle counter circuit 41. A first display cycle counter circuit 41 counts the clock signal 10 and supplies a display cycle count signal 41a to the control signal generator circuit 45. When the count value reaches a value corresponding to a display cycle period (8 in this embodiment as shown in (b) of FIG. 3), the first display cycle counter circuit 41 outputs a first reset signal 41b to the counter reset signal generator circuit 46. The first display cycle counter circuit 41 is reset by the counter reset signal 46a supplied from the counter reset signal generator circuit 46.

Like the first display cycle counter circuit 41, the second display cycle counter circuit 42 outputs a second reset signal 42b to the counter reset signal generator circuit 46 and the horizontal counter 43 when the count value reaches a value "8" corresponding to a display cycle period.

The second display cycle counter circuit 42 is reset by the external synchronization signal 20 or the horizontal reset signal 47a from the horizontal address generator circuit 47.

The horizontal counter circuit 43 counts the second reset signal 42b outputted from the second display cycle counter circuit 42 and supplies a count output signal to the horizontal address generator circuit 47. The horizontal counter circuit 43 is reset at an interval of a horizontal scanning period by the horizontal reset signal 47a supplied via the OR circuit 49 from the horizontal address generator circuit 47. The vertical counter circuit 44 counts the horizontal reset signal 47a outputted from the horizontal address generator circuit 47 and supplies the count output signal to the vertical address generator circuit 48. The vertical address generator circuit 48 is reset at an interval of a vertical scanning period by the vertical reset signal 48a supplied via the OR circuit 50 from the vertical address generator circuit 48. In addition to the reset signal 47a of the horizontal scanning period and the reset signal 48a of the vertical scanning period, the horizontal address generator circuit 47 and the vertical address generator circuit 48 respectively generate a horizontal display address signal 47b and a vertical display address signal 48b, and these signals are combined so as to be outputted as a display address signal 40a.

The external synchronization signal 20 inputted via the external synchronization signal input terminal b from the external synchronization circuit 2 is inputted to the horizontal counter 43 and the vertical counter 44 via the OR circuits 49 and 50, respectively.

The operation will be further described in detail with reference to an example of the display of (b) in FIG. 3.

From the address of the video memory 8 determined by the horizontal address generator circuit 47 during a display cycle period, the data of dots constituting the font corresponding to the character stored at the address are sequentially read. When an 8-dot information, namely, an information associated with a display cycle period is read, the content of the horizontal counter 43 is incremented by one and the horizontal address is changed, thereby sequentially reading from the video memory 8 the information of the next character in the horizontal direction. When the count value reaches 32 as a result of the sequential count-up operation of the horizontal counter circuit 43, the horizontal address generator circuit 47 outputs a horizontal reset signal 47a. Since the video memory 8 is constituted with 256 dots in the horizontal direction and a font comprises 8×8 dots, the horizontal counter circuit 43 is reset each time "32" is counted.

When the count value of the vertical counter circuit 44 counting the horizontal reset signal 47a reaches the line count in the vertical direction (25 lines in (b) of FIG. 3), the vertical counter circuit 44 is reset by the vertical reset signal 48a supplied from the vertical address generator circuit 48.

When the external synchronization signal 20 is inputted, the horizontal counter circuit 43, the vertical counter circuit 44, and the second display cycle counter 42 are forcibly reset by the external synchronization signal 20.

On the other hand, since the external synchronization signal 20 is not directly supplied to the first display cycle counter 41, even if the external synchronization signal 20 is inputted, the first display cycle counter 41 is not reset.

To the counter reset signal generator circuit 46, the first reset signal 41b and the second reset signal 42b are supplied from the first display counter circuit 41 and the second display counter circuit 42, respectively. When the first reset signal 41b is inputted, the counter reset signal generator circuit 46 supplies the counter reset pulse 46a to the first display cycle counter circuit 41, thereby resetting the first display cycle counter circuit 41. The counter reset pulse 46a is continuously supplied to the first display cycle counter circuit 41 until the second reset signal 42b is inputted. Consequently, the first display cycle counter circuit 41 is kept continuously reset during a period from the time when the first reset signal 41b is inputted to the time when the second reset signal 42b is received.

If the phase difference does not appear in the external synchronization signal 20, the first display cycle counter circuit 41 and the second display cycle counter circuit 42 output the first and second reset signals 41b and 42b, respectively each time the same value "8" is counted, and hence the phase of the first reset signal 41b matches with that of the second reset signal 42b. Consequently, the counter reset signal generator circuit 46 supplies the counter reset signal to the first display cycle counter circuit 41 only for a period of a clock for which the first and second reset signals 41b and 42b are inputted.

If the phase difference occurs in the external synchronization signal 20, the second display cycle counter 42 is forcibly reset by the external synchronization signal 20 and then starts the count operation. When "8" is counted, the second display cycle counter 42 outputs the second reset signal 42b. As a result, the generation of the second reset signal 42b is delayed in time with respect to the generation of the first reset signal 41b by a period corresponding to the phase shift of the external synchronization signal 20. The counter reset signal generator circuit 46 continues resetting the first display cycle counter 41 from the time when the first reset signal 41b is generated to the time when the second reset signal is generated. The phase of the first reset signal 41b is matched with that of the second reset signal 42b beginning from the next display cycle period, which limits the disturbance of the picture only to a maximum of a display cycle period.

Figure 4:
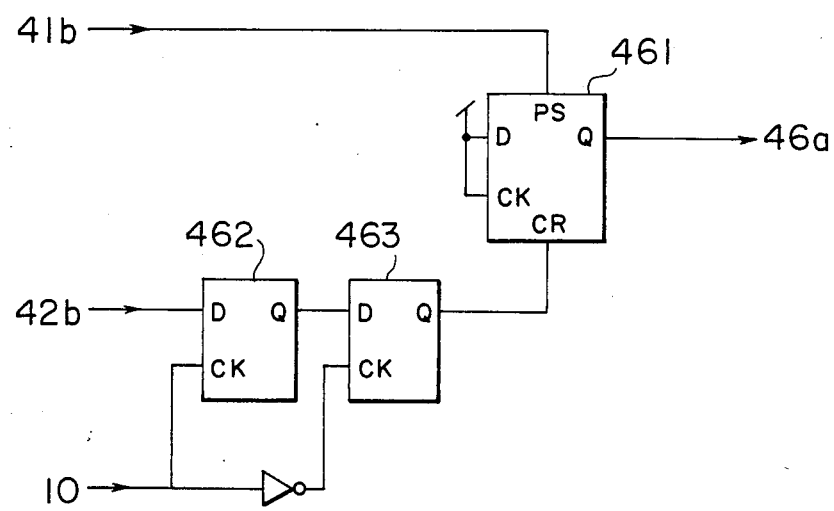
FIG. 4 is a schematic circuit diagram illustrating a counter reset signal generate circuit.

FIG. 4 shows a concrete circuit diagram of the counter reset signal generator circuit 46.

A flip-flop circuit 461 is set by a first reset signal 41b outputted from the first display cycle counter circuit 41 of FIG. 1 and is reset by a signal obtained by delaying a second reset signal 42b outputted from the second display cycle counter circuit 42 by a period of a clock in the flip-flop circuits 462 and 463. Consequently, if the phase of the first reset signal 41b is completely matched with that of the second reset signal 42b, the counter reset signal 46a supplied to the first display cycle counter circuit 41 resets the first display cycle counter circuit 41 at an interval of the display cycle period. However, if the phases of the first and second reset signals become out of the matching condition due to an occurrence of an external synchronization, the first display cycle counter circuit 41 continues the reset state not to count the next display cycle until the display cycle of the second display cycle counter circuit 42 is finished.

FIG. 5 is a timing chart illustrating the timing of the clock signal, the count output signals from the display cycle counter circuits 41-42, the external synchronization signal, and the counter reset signals. In this chart, the phases of the output signals 41a-42a from the first and second cycle counter circuits 41-42, respectively are entirely matched with each other up to time $t_1$. At time $t_0$, the second display cycle counter circuit 42 is subjected to a reset operation by the horizontal reset signal 47a supplied via the OR circuit 49 from the display address generator circuit 47, which causes the count output 42a from the second display cycle counter 42 to be zero. On the other hand, the first display cycle counter circuit 41 is subjected to a reset operation at the same timing as for the second display cycle counter circuit 42 by the counter reset signal 46a outputted from the counter reset signal generator circuit 46, which causes the count output 41a from the first display cycle counter circuit 41 to be zero. At time $t_1$, the external synchronization signal 20 is inputted, and then the horizontal and vertical counter circuits 43-44 are reset via the OR circuits 49-50, respectively. At the same time, the second display cycle counter circuit 42 is also reset, which causes the count output 42a from the second display cycle counter circuit 42 to be zero. On the other hand, the first display cycle counter circuit 41 is not reset at the time $t_1$ and continues counting the count output signal 41a. At time $t_2$, the first display cycle counter circuit 41 finishes the count operation for the display cycle period and the output signal 41a is set to zero. The counter reset signal 46a from the counter reset signal generator circuit 46 continues resetting the first display cycle counter circuit 41 up to time $t_3$ when the counting of the display cycle period of the second display cycle counter circuit 42 is terminated. After the time $t_3$, the count output signals 41a and 42a from the first and second display cycle counter circuits 41-42, respectively are kept matched to each other until the next external synchronization input takes place.

The control signal generator circuit 45 of FIG. 1 generates in response to the count output from the first display cycle counter circuit 41 the control signals to be supplied to the video memory 8 (for example, $\overline{RAS}$, $\overline{CAS}$, $\overline{OE}$, and $\overline{WE}$ to be supplied to the dynamic RAM), the MPU clock signal 40c to be delivered to the MPU 3, and the address change-over signal 40d for changing over the access to the video memory 8 between the display read period and the MPU period and outputs these signals. For the output signals from the control signal generator circuit 45, the waveform is not disturbed or the output thereof is not interrupted during the display cycle even if the external synchronization input suddenly takes place because the count output 41a from the first display cycle counter circuit 41 is continuously outputted until the display cycle is finished. As a result, the destruction of data stored in the video memory 8 and the runaway of the MPU due to the stop of the MPU clock can be prevented.

According to the present invention as described above, in a case where the synchronization signal of the external video signal is used to establish the synchronization of the display of the internal characters and graphics, even if the phase of the external synchronization signal is suddenly disturbed, the control signals to be supplied to the video memory and the MPU are not suddenly disturbed, namely, these signals are continuously outputted for the period of a display cycle in any case and the output thereof is restarted only after an interruption of a maximum of a display cycle period. As a consequence, the processing efficiency of the MPU is hardly lowered.

While the present invention has been described with reference to the particular illustrative embodiments, it is not to be restricted by those embodiments but only by the appended chaims. It is to be appreciated that those skilled in the art can change or modify the embodiments without departing from the scope and spirit of the present invention.

We claim:

1. A video memory control apparatus comprising:
   a video memory for storing a video signal;
   a clock signal input terminal for inputting a clock signal;
   an external synchronization signal input terminal for inputting an external synchronization signal;
   address generating means connected to said external synchronization signal input terminal and said video memory for generating an address signal to said video memory based on said external synchronization signal and for supplying the address signal to said video memory;
   a first counter connected to said clock signal input terminal so as to be reset by a count reset signal for counting the clock signal and for outputting a first reset signal when a predetermined count value is reached;
   memory control signal generating means connected to said first counter and said video memory for supplying to said video memory a read control signal corresponding to an output from said first counter;
   a second counter connected to said clock signal input terminal so as to be reset by the external synchronization signal for repetitiously counting the clock signal up to the predetermined count value and for outputting a second reset signal when the predetermined count value is reached; and
   count reset signal generating means connected to said first counter and said second counter for generating the counter reset signal from the first reset signal and the second reset signal and for supplying the counter reset signal to said first counter.

2. A video memory control apparatus according to claim 1 wherein said counter reset signal generating means starts outputting the counter reset signal in response to the first reset signal and for stopping the output of the counter reset signal in response to the second reset signal.

3. A video memory control apparatus according to claim 1 wherein the address signal generated by said address generating means includes a horizontal address signal and a vertical address signal.

4. A video memory control apparatus according to claim 3 wherein said address generating means comprises:
   a horizontal counter connected to said second counter for counting the second reset signal, said horizontal counter being reset by the external synchronization signal or a horizontal counter reset signal;
   a horizontal address generating circuit to be connected to said horizontal counter for generating the horizontal address signal and for generating the horizontal counter reset signal when an address signal indicating an end of a horizontal direction is generated;
   a vertical counter connected to said horizontal address generating circuit for counting the horizontal counter reset signal, said vertical counter being reset by the external synchronization signal or a vertical counter reset signal; and
   a vertical address generating circuit connected to said vertical counter for generating the vertical address signal and for generating the vertical counter reset signal when an address signal indicating an end of a vertical direction is generated.

* * * * *